INVENTOR
FREDERICK C. FRANK
BY J. Plante

Patented Oct. 25, 1949

2,486,144

UNITED STATES PATENT OFFICE 2,486,144

DISK BRAKE

Frederick C. Frank, South Bend, Ind., assignor to Bendix Aviation Corporation, South Bend, Ind., a corporation of Delaware Application November 13, 1943, Serial No. 510,120

5 Claims. (Cl. 188—72)

This invention relates to disk brakes, and more particularly to disk brakes wherein one or more of the disks is composed of a plurality of separate segments, as disclosed in my copending application Serial No. 453,797, now Patent No. 2,423,882, July 15, 1947.

In the aforesaid application, the segmented disk or disks are provided with a plurality of torque-taking or torque-transmitting connections, a separate or individual torque-transmitting connection preferably being provided for each segment of a disk. If the rotating disk or disks are composed of separate segments, then the torque-taking connections for the several segments are constituted by driving elements or keys which connect the respective segments to a rotating member, such as a vehicle wheel. If the non-rotating or stator disk or disks are composed of a plurality of segments, then the torque-transmitting means comprise a plurality of anchors for transmitting the braking torque from the several segments to a fixed brake member, such as a brake supporting spider which is secured to a non-rotating axle or axle housing.

Heretofore the torque-transmitting connections have been located at the center of each segment, the result being that, during braking, part of the load on each segment constitutes a compressive load, and the remaining load constitutes a tension load. With such an arrangement, in cases of excessively heavy braking, it is possible to crack a segment approximately at the center thereof due to the splitting tendency along the dividing line between compressive load and tension.

It is an object of the present invention to provide torque-transmitting connections for the several segments of a segmented brake disk which will be so positioned and arranged as to insure that the friction force between the stator and rotor of the brake will create compressive force on the segments, rather than tension, thus eliminating the aforementioned possibility of cracking of the segments due to excessively heavy braking.

Figure 1:
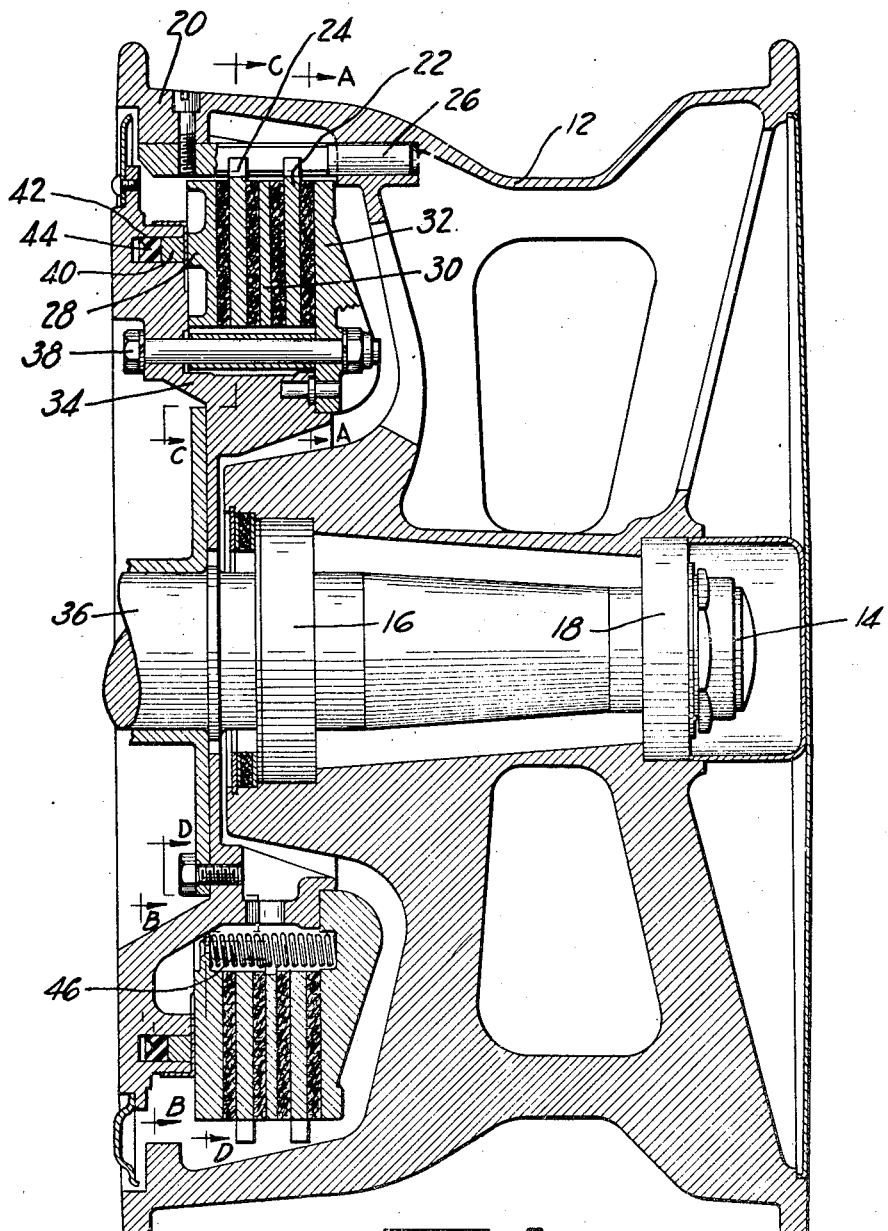
Figure 2:
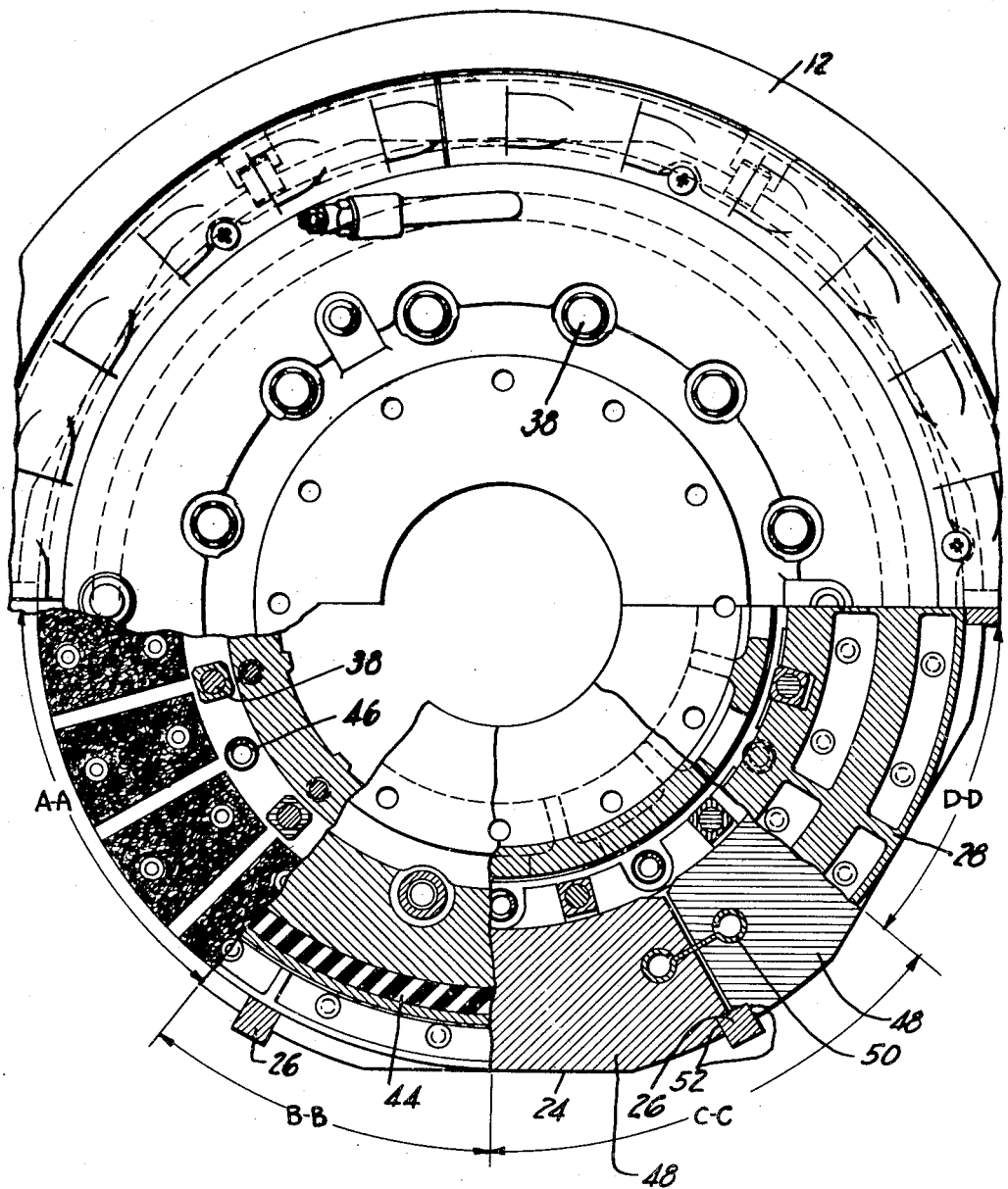

Other objects and advantages of the present invention will become apparent during the course of the following description, reference being had therein to the accompanying drawings:

Figure 1 is a vertical section taken through a wheel and brake assembly incorporating my invention; and Figure 2 is a composite vertical side view of the wheel and brake assembly taken from a position facing the annular friction surfaces of the disks and showing in various sectors of a complete circle the outside of the backing plate or fixed support for the brake applying means, and partially broken away sections taken on the lines A—A, B—B, C—C, and D—D, respectively, of Figure 1.

The disk brake assembly of Figures 1 and 2 comprises, in general, a rotating element or wheel 12 rotatably mounted on a non-rotatable spindle 14, the friction of rotation being minimized by bearings 16 and 18. One or more rotating disks or rotors, such as illustrated rotors 22 and 24, are adapted to rotate with the wheel 12. In the illustrated embodiment, the rotors 22 and 24 are caused to rotate with the wheel by means of a plurality of keys or torque-transmitting connections 26, which are secured to an axially extending flange 20 of the wheel. One or more stators or non-rotatable disks constitute the means for slowing the rotation of the wheel when the rotating and non-rotatable disks are moved axially into frictional contact with one another. In the present instance, there are provided three lined, non-rotatable disks 28, 30 and 32. The non-rotatable disks are supported and are prevented from rotating by means of a supporting member 34 which is in turn secured to a non-rotatable element, such as the axle 36. The supporting member 34 is provided with a plurality of circumferentially spaced anchor bolts 38 which serve to support the non-rotatable disks, to maintain them against rotation, and to take the torque thereof during the time the non-rotatable disks are in contact with the rotating disks. The anchor bolts 38 firmly hold non-rotatable disk 32 against the edge of the supporting member 34. The disks 28 and 30 are keyed to the anchor bolts 38 in such a way as to be capable of axial movement along said anchor bolts. Likewise, the rotating disks 22 and 24 are capable of axial movement along the keys 26, said keys extending into notches in the periphery of the disks.

Bearing against disk 28 is an annular piston 40 reciprocable in an annular chamber 42 which is formed in the supporting member 34. An annular resilient seal 44 is provided in the chamber 42 to prevent loss of fluid. Admission of hydraulic fluid under pressure into chamber 42 causes movement of piston 40 in a direction to move the various disks into contact with one another, the disk 32 being prevented from axial movement and thereby serving as a wall against which the axially movable disks are compressed. The frictional force between the rotating and non-rotating disks causes the torque of the rotating wheel 12 to be transmitted to the stationary supporting member 34, the wheel being eventually brought to a stop. A plurality of circumferentially spaced springs 46 serve to return the brake disks to released position when the hydraulic pressure is removed.

Each of the rotors 22 and 24 is composed of a plurality of separate segments 48, each segment being individually driven by one of the keys 26. If desired, the stator disks might be segmented instead of the rotor disks, or both the rotating and non-rotating disks might be segmented. If the non-rotating disks were segmented, then each segment of those disks would preferably be provided with its own anchor bolt 38. The provision of a separate torque-transmitting connection for each segment prevents any difficulties arising from expansion of the segments or from a tendency of the segments to get out of proper position due to unequal spacing of the keys and keyways. The segments are connected together only by the members 50 which have enlarged ends extending into pockets in each segment. The members 50 maintain the segments in their proper relative positions, and prevent them from falling out of the assembly.

In order to prevent cracking of the segments, each of the keys 26 is positioned at the end of the segment which it is to drive, i. e., between two segments, rather than at the center of the segment, as was the case in the disk brakes disclosed in the earlier applications referred to above. Thus, when the brakes are applied, the friction force between the stator and rotor disks creates only compressive force on the segments of the rotor disk. For example, if the rotor shown in Figure 2 is rotating in a counterclockwise direction, and the brakes are applied, each segment of the rotor will transmit its braking torque to the key which is at the rear of that particular segment, i. e., the key which is behind the respective segment and is therefore driving or pushing the segment in the counterclockwise direction. In order that each key 26 may help to maintain the assembled segments in their proper relative positions, I prefer to cut a notch 52 in each corner of each segment, and fit each key into the space provided by the pair of notches formed at the adjacent ends of two segments. It would not be necessary to cut such a notch in the segment which is not driven by a given key, since the entire opening for the notch could be provided at the rear edge of the segment which the particular key is intended to drive.

If the stator disk or disks, rather than the rotor disks, were segmented, then the anchor bolts 38 would be positioned between the segments, in order that the full anchoring load transmitted through the segments would constitute a compressive load.

It is intended that this application broadly "cover" the invention whether the segmented portions of a disk brake are rotors, or stators, or both.

While I have shown and described a specific embodiment of my invention, it will be apparent that, without departing from the scope thereof, many other embodiments might be made. It is therefore my intention that the scope of my invention be limited, not by the illustration and description, but only by the terms of the appended claims.

I claim:

1. A disk brake comprising a rotating disk and a non-rotating disk, at least one of which is constituted by a plurality of separate segments spaced sufficiently from one another to permit substantially free individual expansion of the segments under the influence of heat, a plurality of members interconnecting adjacent segments to retain the several segments in self-supporting disk form, and a plurality of torque-taking members each of which is located in an opening formed in the adjacent ends of two adjacent segments and each of which during braking serves as the sole torque-taking means for one of said adjacent segments.

2. A wheel and brake assembly comprising a rotating wheel, a plurality of circumferentially spaced driving keys rotatable with said wheel and substantially parallel to the axis thereof, a brake rotor comprising a plurality of separate segments arranged in end-to-end relationship and spaced sufficiently from one another to permit substantially free individual expansion under the influence of heat, a plurality of tie members interconnecting adjacent segments to form an articulated disk which constitutes a unit in the brake structure, each of said segments having a notch formed at the rear peripheral corner thereof and receiving one of said driving keys in order that each segment will be individually driven by a single one of said keys and the load thereon due to braking torque will be substantially entirely a compressive load, and a brake stator comprising a disk engageable with the rotor and prevented from rotation by engagement with a non-rotatable member.

3. A wheel and brake assembly comprising a rotating wheel, a plurality of circumferentially spaced driving keys rotatable with said wheel and substantially parallel to the axis thereof, a brake rotor comprising a plurality of separate segments arranged in end-to-end relationship and spaced sufficiently from one another to permit substantially free individual expansion under the influence of heat, the adjacent ends of said segments having facing notches receiving one of said driving keys in order that each segment will be individually driven by a single one of said keys and the load thereon due to braking torque will be substantially entirely a compressive load, a plurality of members inter-connecting adjacent segments to retain the several segments in self-supporting disk form, and a non-rotatable brake stator comprising a disk engageable with the rotor, said rotor and stator disks having flat friction surfaces lying in planes perpendicular to the axis of the wheel and brake assembly.

4. A wheel and brake assembly comprising a rotating wheel, and a brake comprising a rotating disk and a non-rotating disk, at least one of which is composed of a plurality of separate segments arranged in end-to-end relationship and spaced sufficiently from one another to permit substantially free individual expansion under the influence of heat, the adjacent ends of said segments having facing notches, a plurality of members interconnecting adjacent segments to retain the several segments in self-supporting disk form, and a plurality of circumferentially spaced torque-taking members each received in a pair of facing notches to take substantially the entire braking torque of the associated segment.

5. A friction disk comprised of a plurality of separate segments spaced sufficiently from one another to permit substantially free individual expansion under the influence of heat, each of said segments having an opening therethrough near each end thereof, and a plurality of interconnecting members which have end portions extending into the openings provided in adjacent segments to retain the segments in disk form, the adjacent ends of each pair of adjacent segments having facing corner notches adapted to receive a single torque-taking key.

FREDERICK C. FRANK.

REFERENCES CITED

The following references are of record in the file of this patent:

UNITED STATES PATENTS

| Number | Name | Date |
|---|---|---|
| 795,974 | Hele-Shaw | Aug. 1, 1905 |
| 1,803,430 | Hand | May 5, 1931 |
| 2,021,266 | Shelor | Nov. 19, 1935 |
| 2,228,622 | Emrick | Jan. 14, 1941 |
| 2,405,219 | Lambert | Aug. 6, 1946 |
| 2,423,881 | Du Bois | July 15, 1947 |
| 2,423,882 | Frank | July 15, 1947 |